E. V. BEALS.
INTERNAL COMBUSTION ENGINE.
APPLICATION FILED MAY 28, 1919.
1,434,801.
Patented Nov. 7, 1922.
4 SHEETS—SHEET 1.
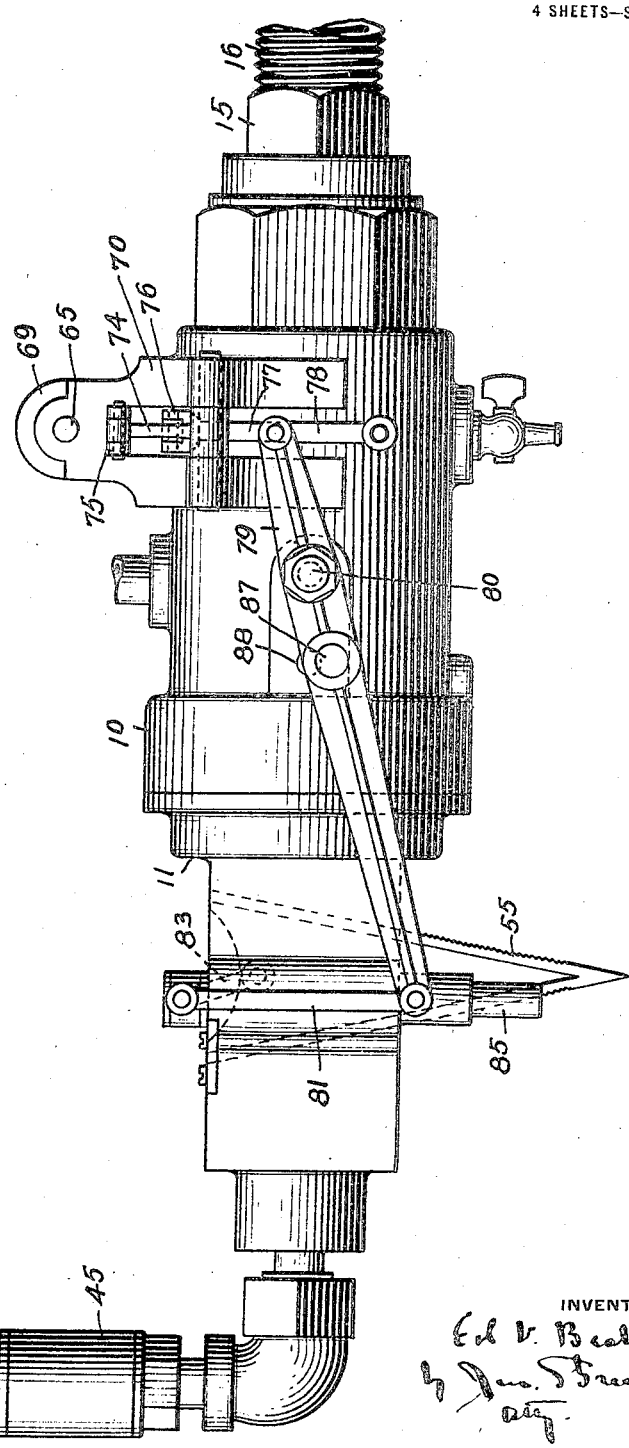
FIG. 1.
WITNESSES
INVENTOR
Ed V. Beals

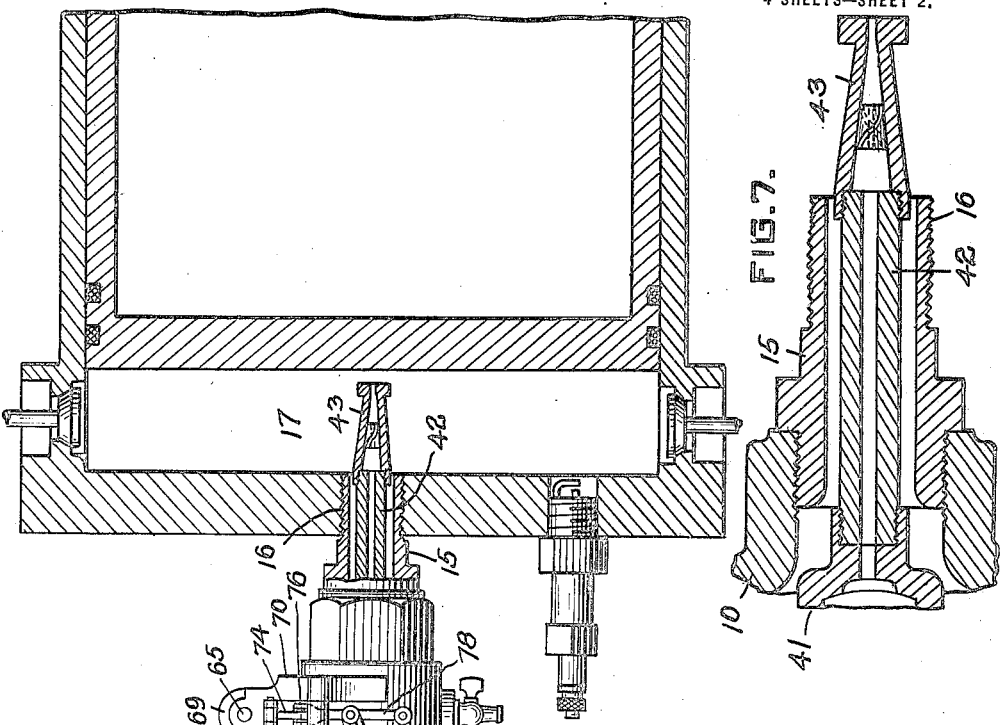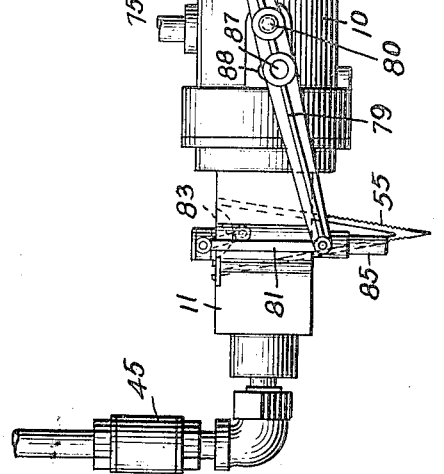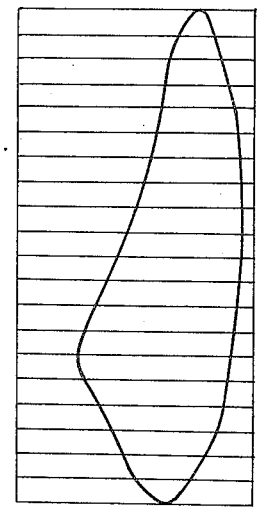

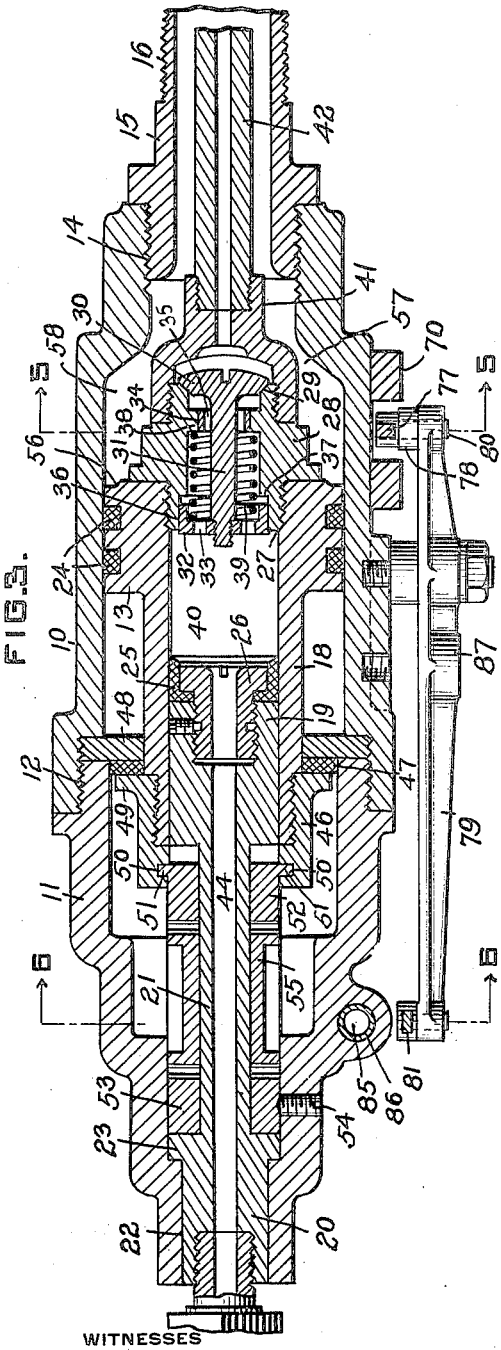

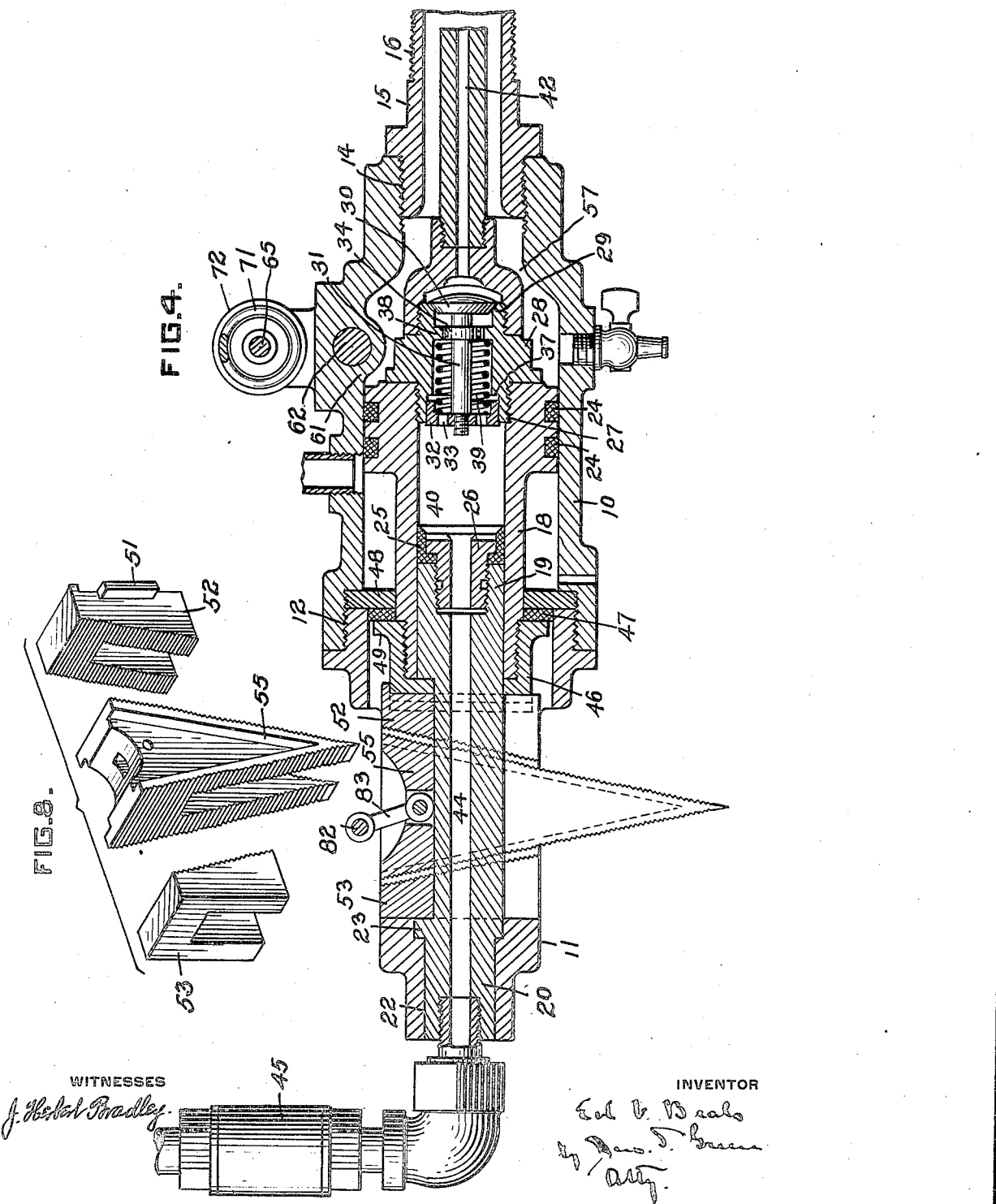

Patented Nov. 7, 1922.

1,434,801

UNITED STATES PATENT OFFICE.

ERL V. BEALS, OF BOSTON, MASSACHUSETTS.

INTERNAL-COMBUSTION ENGINE.

Application filed May 28, 1919. Serial No. 300,401.

*To all whom it may concern:*

Be it known that I, ERL V. BEALS, a citizen of the United States, and a resident of Boston, in the county of Suffolk and State of Massachusetts, have made a new and useful invention in Improvements for Internal-Combustion Engines, of which the following is a specification.

This invention relates to internal combustion engines.

In the operation of internal combustion engines of both the two and four cycle type I have discovered that I can omit external cooling if the proper amount of water is injected into the engine cylinders simultaneously with, or immediately after, attainment of the initial pressure due to the burning of the explosive charge in the cylinder. If the proper amount of water is injected at the proper time the engine will remain sufficiently cool at all loads for satisfactory running and a greater thermal efficiency than is now obtainable will result.

An object of this invention is to provide a device by means of which the pressure due to the burning of the combustible charges is utilized in injecting water into the engine cylinder simultaneously with the initial pressure in the cylinder due to the burning charge, said device being arranged to proportion the amount of water injected in accordance with the initial pressure.

Another object is to provide a method of operating internal combustion engines whereby a higher thermal efficiency than is now obtainable will result.

A still further object is to provide a method of operating internal combustion engines by means of which all external cooling of the engine cylinders is obviated and the necessary cooling carried out with an increase instead of a decrease in thermal efficiency as is now the case.

A still further object is to provide a method of operating internal combustion engines whereby ignition is automatically accomplished without the aid of hot tubes, hot chambers or electric devices and without the knock or pound incident to preignition in externally cooled internal combustion engines or in internal combustion engines of the ordinary types.

In engines which I have operated in accordance with this invention on kerosene or fuel oil I have first started the engine on a readily inflammable liquid fuel such as gasoline and have used electric ignition in starting. As soon as the engine becomes sufficiently warm (which occurs after a few strokes) I have changed over to the heavy fuel and have then been able to cut out the electric ignition, spontaneous or automatic ignition occurring without any knock or pound and this even though the ignition occurred 90° early with the engine operating over a wide range of load.

The water injected apparently has much to do with the spontaneous or automatic ignition, since the ignition ceases when the injection of water is stopped, or shortly thereafter, showing that the spontaneous or automatic ignition was not caused from an overheated engine but is probably due to the moisture in the unscavenged charge. The heat of the cylinder walls, the compression, the heavy fuel and the moisture may all contribute to the ignition but since the ignition ceases after the water is cut off the water apparently has a profound effect in causing the ignition.

Indicator cards taken from engines operated in accordance with this invention more nearly resemble steam engine indicator cards than they do typical internal combustion engine cards; the maximum pressure occurring at a point during the expansion stroke when it is most effective.

I find that engines operating in accordance with this invention instead of having exhaust temperatures running around a thousand degrees have exhaust temperatures of about 250° and the heat of the exhaust which is usually wasted is utilized by being converted into available energy. On account of the low exhaust temperatures and therefore low exhaust pressures I find that I am able to do away with the mufflers or exhaust pits now commonly used, and the exhaust is practically as silent as that from steam engines of like power and speed.

I find that in using kerosene as a fuel the best results occur when I adjust my device so as to inject about six times, by volume, as much water as fuel. I find that four times the quantity is not as satisfactory as six and ten times the quantity causes the engine to run too cool for the highest efficiency.

In the drawings accompanying and forming a part of this application, Figure 1 is a view in side elevation of a water injecting device embodying this invention, and Fig. 2 is a similar view of said device shown in position on an internal combustion engine. The engine is more or less diagrammatic and is illustrated in sectional elevation.

Fig. 3 is a longitudinal section in plan of the device shown in Figs. 1 and 2.

Fig. 4 is a longitudinal sectional elevation of the device.

Fig. 5 is a cross sectional view taken on line 5—5, Fig. 3, looking in the direction of the arrows.

Fig. 6 is a cross sectional view taken on line 6—6, Fig. 3, looking in the direction of the arrows.

Fig. 7 is an enlarged detailed sectional view of the discharge end of the device.

Fig. 8 is a view in perspective of three of the cooperating elements of the device and Fig. 9 is a typical indicator card made from an engine operating in accordance with this invention.

Throughout the several views like elements are denoted by like characters.

In the preferred form as shown in the drawings the injection device consists of a housing made up of two parts 10 and 11 threaded together at 12. Part 10 is bored and finished to receive a displacer piston or plunger 13. The forward end of the housing is internally threaded at 14 to receive a nipple or connector 15 externally threaded at 16 for insertion through one wall of the engine cylinder in order that the water in the form of a mist or spray may be projected into the combustion space 17 of the engine.

Displacer plunger 13 at its rear end is provided with a tubular extension 18 internally threaded to receive a stationary displacer 19 which is connected to a plug 20 by means of a rectangular waist portion 21. Plug 20 fits the internal bore 22 at the rear end of the housing with a pressed fit and is provided with a shoulder 23 which serves as an additional means of preventing movement of displacer 19 away from the nozzle end of the device.

Displacer plunger 13 is provided with packing rings 24 and stationary displacer 19 is provided with a cup leather packing 25 held in place by means of a retaining screw 26. Displacer plunger 13 is internally threaded at 27 to receive a valve housing 28 provided with a seat 29 for a poppet valve 30. The stem 31 of the valve carries a guiding member 32 having water passages 33 extending therethrough from front to rear. The valve stem is formed with an internal cylindrical enlargement 34 which is provided with water passages 35 extending therethrough from front to rear. The periphery of guide member 32 is machined to fit the enlarged bore 36 of the valve housing and the inner end of this machine is adapted to contact with shoulder 37 to limit the movement of the valve away from its seat. The periphery of enlargement 34 is machined to fit the inner surface of a shoulder 38 and forms a guide for the valve 30. A coil spring 39 interposed between shoulder 38 and guiding member 32 tends to hold the valve to its seat and has sufficient tension to prevent said valve from being unseated during the suction strokes of the engine and also sufficient tension to prevent the valve from opening under normal water pressure in water chamber 40 of the device.

Threaded to the outer end of valve housing 28 is a member 41 which serves as a reducer and connector for a nipple 42 to the outer end of which a spray nozzle 43 is attached. The spray nozzle may be of any desired form capable of breaking up or pulverizing the water projected therethrough into a fine mist or vapor.

The stationary displacer 19, plug 20, waist 21 and retainer screw 26 are provided with registering longitudinal ducts which form a passage 44 through which water is supplied to water chamber 40 from any suitable source of water supply under pressure, and a check valve 45 of suitable design is interposed between water chamber 40 and the source of supply, in order to prevent the backflow of water to the supply upon the movement of displacer plunger 13 toward stationary displacer 19. A cap 46 is threaded onto the rear reduced end of tubular extension 18 of the displacer plunger 13, and a buffer ring 47, preferably formed of leather, is held in place by means of a metal ring 48, which is interposed between members 10 and 11 of the housing. Cap 46 is provided with an annular shoulder 49 adapted to contact with buffer ring 47 to limit and cushion the inner movement of displacer plunger 13 away from stationary displacer 19 under the influence of the water pressure of the source of supply.

Cap 46 is provided with slots 50 adapted to receive ears 51 formed on either side of a wedge block 52 which is bifurcated and freely straddles the rectangular waist portion 21 of stationary displacer 19. A wedge block 53 bifurcated to straddle the waist 21 is secured in place next to shoulder 23 of plug 20 by means of a set screw 54, and a V wedge 55 bifurcated to freely straddle the waist 21, by means of suitable mechanism, is caused to assume different vertical positions between wedge blocks 52 and 53 in order to control the movements of displacer plunger 13 toward stationary displacer 19, thereby varying the amount of water projected from water chamber 40 through valve 30 and spray nozzle 43 into the combustion space 17 of the engine cylinder.

As shown in Fig. 8 V wedge 55 is cut away until it is as light as is consistent (thereby reducing its inertia) with the duty it has to perform and the cooperating faces of wedge blocks 52 and 53, as well as the adjacent faces of V wedge 55 are transversely serrated or grooved to prevent displacement of the V wedge, due to camming action, when the wedge surfaces are forcibly brought together as occurs after displacer plunger 13 has been forced by the pressure of the explosion which pressure is communicated to the outer face 56 of the displacer plunger 13 through the clearance space 57 between the inner wall of connecting nipple 15 and nipple 42.

*Wedge operating mechanism.*

Clearance space 58 communicates by means of a channel port 59 with the inner end of a cylindrical chamber 60 formed in an enlargement 61 of housing member 10 and said chamber extends transversely of the housing and at right angles to its axis. A plunger 62 fitted to reciprocate within chamber 60, at its outer end carries an arm 63. A stuffing box 64 prevents leakage past plunger 62.

Arm 63 of plunger 62 is bifurcated and straddles one end of a rod 65 between stops 66 and 67 formed on said rod. A guide bushing 68 carried by housing member 10 cooperates with a guide 69 formed on a bracket 70 secured to housing member 10, in guiding rod 65 in a path parallel to and with plunger 62. A coil spring 71 confined between a stationary stop 72 and an abutment 73 pinned to rod 65 tends to force plunger 62 toward channel port 59. Abutment 73 is connected to one arm 74 of a bell crank lever by means of a link 75 and the other arm 76 of said lever, by means of links 77 and 78, connects with the forward or short end of a lever 79 pivoted at 80 to the housing member 10. The rear or long end of lever 79, by means of a link 81, cross bar 82 and a link 83, connects with V wedge 55. Cross bar 82 is secured to the upper end of a tubular guide stem 85 which is mounted to slide within a suitable bore 86 provided in a portion of housing member 11.

From this construction it will be seen that as plunger 62 is forced, by means of the explosion pressure within clearance space 58 of the housing, away from channel port 59 the wedge 55 will be lifted more or less from its normal position shown in the drawings; the degree of lift being dependent upon the initial pressure of the explosion or combustion within combustion chamber 17. The tension of coil spring 71 is such as to hold plunger 62 against movement under any pressures encountered during the compression strokes of the engine.

Lever 79 is provided with an additional boss 87 and housing member 10 is drilled and tapped at 88 to receive the lever pivot pin or stud, so that if desired the fulcrum of the lever may be changed to suit various size engines. Abutment 72 for coil spring 71 is threaded onto a threaded extension 89 of bearing bushing 68 and is knurled so as to provide easy tension adjustment of spring 71 so that the throw of the V wedge 55 may be controlled and adjusted while the device is in operation.

The device will be adjusted so that when a maximum initial explosion or combustion pressure occurs in the combustion space of the engine the governing wedge 55 will be moved its maximum distance, allowing displacer plunger 13 carrying wedge block 52 to move its maximum distance toward stationary displacer 19 in order to expel all the water from water chamber 40 into the combustion space 17 through spray nozzle 43. During light loads (on a throttling engine) the initial combustion or explosion pressures will be less than at heavy loads and therefore the movement of the governing wedge will be less and consequently the movement of displacer plunger 13 toward stationary displacer 19 with a correspondingly smaller injection of water into the engine combustion space.

Since the resistance to movement of controlling plunger 62 is determined by the tension of coil spring 71 and is less than the resistance to movement of displacer plunger 13 governing wedge 55 reaches a position, determined for each initial explosion pressure, and at that position it limits the movement of displacer plunger 13 toward stationary displacer 19 and consequently determines the amount of water injected into the combustion space which will be proportioned to the explosion charge.

It, of course, is preferable to design the engine to accommodate this device but it may be used with satisfactory results on all the existing types of internal combustion or explosion engines now on the market.

When the device of this invention is used in connection with any of the existing types of internal combustion or explosion engines, and external cooling by means of water, as is now customary is omitted, any of the not readily inflammable liquid fuels may be used without any modification in the engine design, or the use of any special carbureting devices. Where it is possible it is desirable to increase the compression in order to obtain the best results although this is not necessary for satisfactory operation. I have found that it is possible in using kerosene as a fuel to run the compression pressures up to 200 lbs. or more without any noticeable increase in the strains or stresses on the cranks or connecting rods or any knock or pound such as usually occurs with such compression and fuel.

When the device is used on large double acting engines the temperatures are reduced so that it becomes unnecessary to water cool the pistons, the rods or the exhaust valves.

The card shown in Fig. 9 is a typical card of an engine operating in accordance with this invention.

While various devices have heretofore been suggested for injecting water into the engine combustion space during combustion therein and while in some of these devices the pressure due to the combustion has been utilized for forcing the water into the combustion space against the pressure therein, none of these devices, so far as I am aware, have varied the amount of water injected in accordance with variations in the combustible charges nor with none of these devices has the amount of water been automatically varied to meet the load requirements. With none of these devices has it been possible to omit external cooling under varying conditions of load.

In accordance with the provisions of the patent statutes I have described the principle of operation of my invention, together with the device which I now consider to represent the best embodiment thereof, but I desire to have it understood that the device shown is only illustrative and that the invention can be carried out in other ways.

Having thus described my invention, what I claim as new and desire to secure by Letters Patent is—

1. A liquid injecting device for internal combustion engines comprising a chamber adapted to contain liquid, an explosive pressure actuated displacer, a positive stop for said displacer, and means operating automatically to shift said stop whereby the travel of said displacer is controlled.

2. A liquid injecting device for internal combustion engines comprising a chamber adapted to contain liquid, an explosive pressure actuated displacer, a stop for positively limiting the injecting movements of said displacer, and means for automatically shifting said stop.

3. A liquid injecting device for internal combustion engines comprising a chamber adapted to contain liquid, an explosive pressure actuated displacer, a stop for positively limiting the injecting movements of said displacer, and means the operation of which is dependent upon explosive pressure for automatically shifting said stop.

4. A liquid injecting device for internal combustion engines comprising a chamber adapted to contain liquid, an explosive pressure operated displacer for ejecting liquid from said chamber, a movable agent for positively limiting the ejecting movements of said displacer, and means for automatically positioning said movable agent.

5. A liquid injecting device for internal combustion engines comprising a chamber adapted to contain liquid, an explosive pressure actuated displacer for ejecting liquid from said chamber, and means movable by explosive pressure and arranged to abruptly stop the ejecting movements of said displacer.

6. In combination with the combustion space of an internal combustion engine, a chamber adapted to contain liquid, a displacer actuated from the pressure derived from said space for ejecting liquid from said chamber, a positive stop for limiting the ejecting movements of said displacer, and means operated by pressure for moving said stop to vary the amount of liquid injected.

7. In combination with the combustion space of an internal combustion engine, a displacer operated solely by the pressure due to combustion for forcing water into said chamber, and an adjustable, positive stop operating automatically to control the amount of water so forced.

In testimony whereof, I have hereunto subscribed my name this 22d day of January, 1919.

ERL V. BEALS.